United States Patent
Ichimura

(10) Patent No.: US 8,061,495 B2
(45) Date of Patent: Nov. 22, 2011

(54) RUBBER-TIRE GANTRY CRANE WITH SHORE POWER

(75) Inventor: Kinya Ichimura, Foster City, CA (US)

(73) Assignee: Paceco Corp., Hayward, CA (US)

( * ) Notice: Subject to any disclaimer, the term of this patent is extended or adjusted under 35 U.S.C. 154(b) by 665 days.

(21) Appl. No.: 11/986,326

(22) Filed: Nov. 20, 2007

(65) Prior Publication Data

US 2009/0127048 A1    May 21, 2009

(51) Int. Cl.
*B60L 9/00* (2006.01)
*B61B 3/00* (2006.01)

(52) U.S. Cl. ......................... 191/33 R; 104/98
(58) Field of Classification Search ................... 191/2, 3, 191/12 R, 12.2 R, 12.4, 22 R, 33 R, 34; 104/96, 104/98
See application file for complete search history.

(56) References Cited

U.S. PATENT DOCUMENTS

| | | | |
|---|---|---|---|
| 5,788,033 A | * | 8/1998 | Lucking et al. ............ 191/33 R |
| 7,554,278 B2 | * | 6/2009 | Wegner-Donnelly et al. ............................ 318/375 |

FOREIGN PATENT DOCUMENTS

| | | |
|---|---|---|
| DE | 103 46 796 A1 | 5/2005 |
| DE | 10 2004 010 988 A1 | 9/2005 |
| EP | 1 820 769 A1 | 8/2007 |

OTHER PUBLICATIONS

Kim, Donghyun, and Langley, Richard, "On Ultrahigh-Precision GPS Positioning and Navigation", Journal of the Institute of Navigation, vol. 50, No. 2, Summer 2003.
Martin Scheffler, Klaus Feyrer, Karl Matthias, "Fordermaschinen—ISBN 3-528-06626-1", 1998, pp. 129-131.

* cited by examiner

*Primary Examiner* — Joe Morano, IV
*Assistant Examiner* — R. J. McCarry, Jr.
(74) *Attorney, Agent, or Firm* — GSS Law Group

(57) ABSTRACT

An apparatus for coupling power from shore power to a rubber tire gantry (RTG) crane comprises a power junction trolley and optionally an RTG crane. The power junction trolley receives power through a high voltage cable or alternatively through an inductive power coupling and alternatively outputs a low AC or a low DC voltage through a flexible power cable for connection to an RTG crane. A guiding apparatus directs the power junction trolley along a selected path so as to reduce a control accuracy requirement for the RTG crane. The RTG crane may move from a selected path to another selected path without interrupting a high voltage connection. The power junction trolley optionally determines its position relative to a selected path comprising a guide rail in some embodiments and a guide wire in others. Embodiments of the power junction trolley are alternately self-propelled or towed by the RTG crane.

19 Claims, 9 Drawing Sheets

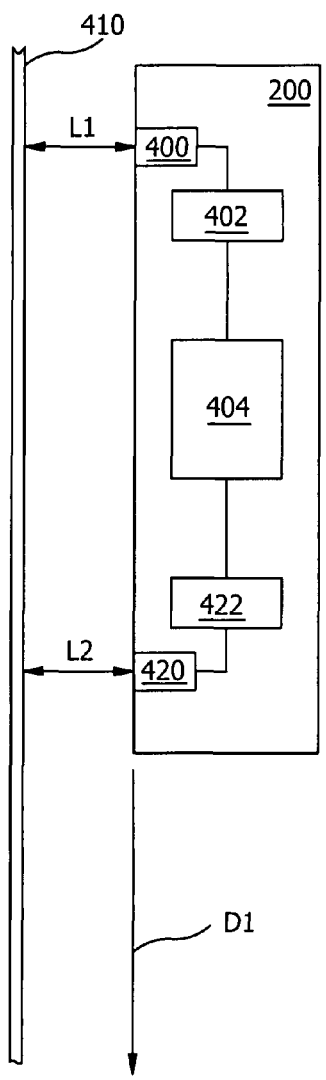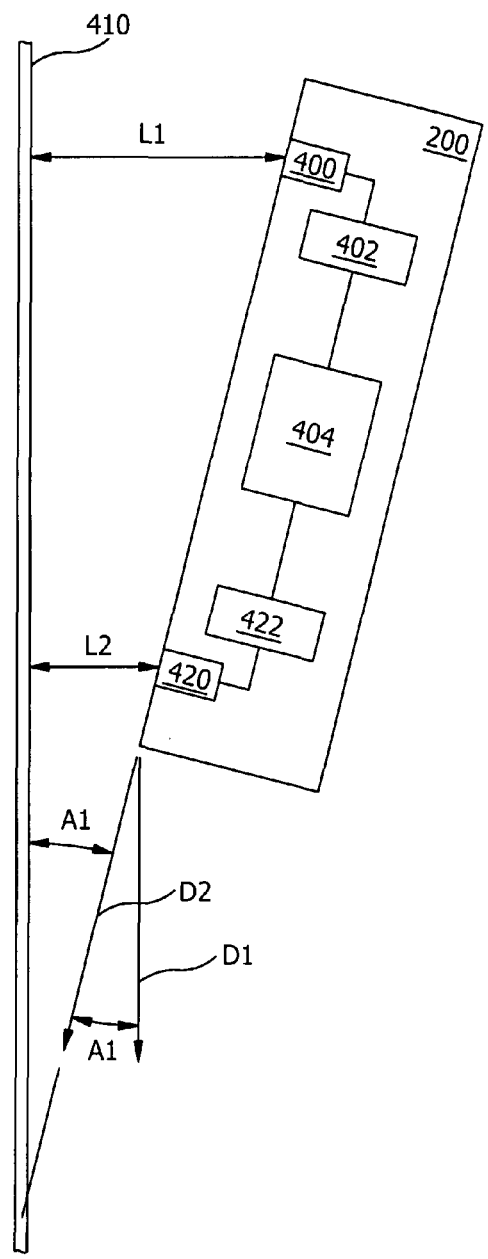
Fig. 11
Fig. 12

RUBBER-TIRE GANTRY CRANE WITH SHORE POWER

CROSS REFERENCE TO RELATED APPLICATIONS

This application claims the benefit of the priority date of provisional patent application No. 60/937,253 filed Jun. 25, 2007, entitled: METHOD AND APPARATUS FOR SHORE POWERED RUBBER TIRE GANTRY CRANES.

FIELD OF THE INVENTION

The present invention relates generally to an apparatus for supplying electrical power to a gantry crane.

BACKGROUND

Gantry cranes are adapted for lifting and moving a large, heavy load such as a freight container. A gantry crane comprises a hoist mounted on a hoist carriage able to move laterally along one or more crossbeams. Two or more vertical supports, each attached at an upper end to an end of a crossbeam, hold the crossbeam above the ground. Some gantry cranes have wheels and motors coupled to structural members attached to the lower ends of the vertical supports, enabling the gantry crane to traverse under power from a location where a load is to be picked up to another location where the load is to be set down.

Mobile gantry cranes as used in freight yards generally have a pair of parallel crossbeams for supporting the hoist and hoist carriage, at least four vertical supports, and wheels near each lower corner of the crane. Some gantry cranes known as rail-mount gantry cranes (RMG crane) have flanged metal wheels adapted for rolling on track rails fixed to the ground, similar to wheels and rails used by trains. Rails enable an RMG crane to move quickly and precisely, but the cost of installing or relocating rails is high. Another type of gantry crane known as a rubber tire gantry crane (RTG crane) has rubber tires instead of metal wheels and is not constrained to operate from fixed rails. Instead, the RTG crane wheels move on a prepared surface known as a runway. A pair of parallel runways comprises a lane along which the RTG crane moves. RTG crane wheels may be steerable for changing a direction of travel of the RTG crane, for example to move from one lane to another. RTG cranes are sometimes preferred over RMG cranes where logistical flexibility is desirable.

Some RTG cranes are powered by an onboard diesel engine coupled to an electrical generator. Electrical output from the generator supplies power to electric motors for moving the RTG crane and operating the hoist and other equipment. However, emissions from diesel engines are becoming a matter of concern in some ports and terminal areas. An alternative is to operate an RTG crane from electrical power supplied from an electrical distribution network in the terminal area. Electrical distribution networks are sometimes referred to as shore power when the network is close to a loading and unloading area for cargo ships.

An example of an RTG crane operated from shore power is shown in FIG. 1. An RTG crane 100 representative of an RTG crane known in the art comprises a hoist 102 and rubber tires 104. The RTG crane 100 is pictured moving along runways 112. Two parallel runways 112 comprise an RTG lane. A runway 112 may comprise reinforced concrete pavement having sufficient strength to bear the weight of a heavily-loaded RTG crane. The RTG crane 100 straddles a load, lifts it, and transports it along an RTG lane. In the example of FIG. 1, one of a stack of freight containers 114 is an example of a load to be lifted and transported by the RTG crane 100. One of the freight containers in FIG. 1 has a width dimension of approximately 8 feet (2.4 meters), a height dimension of approximately 8 feet 6 inches (2.6 meters), a length of approximately 20 feet (6.1 meters), and may weigh 20 tons (approximately 18,000 kilograms) or more. Freight containers having other dimensions and maximum weights are also moved by RTG cranes. Some RTG cranes are capable of lifting much larger loads than a single freight container.

A substantial amount of electrical power may be required to operate an RTG crane. The RTG crane 100 of FIG. 1 receives electrical power through a cable connected to shore power. For reasons of transmission efficiency, power may be transmitted through the cable at a high voltage and a relatively low current. Transmitting power at a relatively low current allows the use of a cable having a smaller diameter and less stiffness than a cable carrying high current. For example, input power for some RTG cranes is an alternating current (AC) with a voltage in a range from about 2000 volts AC (VAC) to about 6000 VAC. To avoid damaging the cable and exposing personnel and equipment to high voltage, the cable carrying RTG crane input power may be placed in a trench next to a runway. Fences or other barriers may also be installed to further protect personnel, the cable, and other equipment.

High voltage cable is wound and unwound from a cable reel on the RTG crane 100 of FIG. 1 as the crane traverses along an RTG lane. In FIG. 1, a crane-mounted cable reel 106 is attached to a side of the RTG crane 100. A high voltage cable 108 is lifted from a cable trench 110 and wound around the crane-mounted cable reel 106 as the RTG crane 100 moves along an RTG lane. When the RTG crane 100 moves in the opposite direction along the lane, the high voltage cable 108 is unwound from the crane-mounted cable reel 106 and placed back into the cable trench 110. A rotary power coupler at the hub of the crane-mounted cable reel 106 connects high voltage from the high voltage cable 108 to the input side of a high voltage transformer 116. The output of the high voltage transformer 116 is a relatively low AC voltage, for example an AC voltage in a range from about 400 VAC to about 500 VAC. The transformer output voltage is connected to an electrical input on the RTG crane to operate electric motors and other equipment.

Some freight terminals have more than one RTG lane to enable an RTG crane to access multiple loading and unloading locations. An example of a terminal area having more than one RTG lane is shown in FIG. 2. In FIG. 2, a first load location A and a second load location B are serviced by an RTG crane 100 moving along a first RTG lane comprising two runways 112-1. A second pair of runways 112-2 forming a cross lane provide access for the RTG crane 100 to a third load location C, which is approached on a third RTG lane comprising two runways 112-3. A first cable trench 110-1 holds a high voltage cable that is connected to the RTG crane 100 when the RTG crane is traveling between locations A and B. A second cable trench 110-2 holds a high voltage cable that is connected to the RTG crane 100 when the RTG crane is moving along the RTG lane that straddles load location C.

To move cargo from load location A to load location C in the example of FIG. 2, the RTG crane 100 performs a cross-lane maneuver by advancing on runways 112-1 from location A to a position near cross lane runways 112-2. The high voltage cable from the first cable trench 110-1 is disconnected from the RTG crane 100 and a mobile source of high voltage electrical power 118, for example a truck-mounted electrical generator, is connected by a cable to the RTG crane 100. The RTG crane 100 turns onto the cross lane and moves near the RTG lane comprising the runways 112-3 for load location C. The RTG crane 100 is guided onto the RTG lane for load location C, the mobile high voltage source 118 is disconnected from the RTG crane, and the high voltage cable in the second cable trench 110-2 is attached to the RTG crane. Finally, the RTG crane 100 proceeds to load location C and unloads its cargo there.

In the cross-lane maneuver described above, there are two high voltage disconnection steps and two high voltage connection steps as the RTG crane 100 moves from shore power to a mobile power generator to shore power again while changing lanes. Because of safety hazards associated with high voltage, at some freight terminals high voltage cables may be connected and disconnected only by specially trained personnel. Cargo operations may be slowed if trained personnel are not available at the time and place a cross-lane maneuver is to be performed. Cargo operations may further be slowed by the time needed to make and unmake high voltage connections.

It is preferred that the RTG crane 100 be guided so that the high voltage cable 108 is pulled from or placed into the cable trench 110 with a minimum of stress and wear on the cable and crane-mounted cable reel 106. It is further preferred that the high voltage cable 108 is laid flat and straight in the bottom of the cable trench 110. For example, some high voltage supply systems require an RTG crane 100 to deviate from a selected line of travel by a distance of less than about ±0.4 inch (±10 mm) to achieve a selected high voltage cable placement. However, an RTG crane 100 having a common type of steering system meanders about 6 inches (150 mm) on either side of a selected line of travel as the RTG crane 100 traverses along a runway. Furthermore, it is well known that some human operators achieve a guiding accuracy of about ±10 inches (254 millimeters) while driving diesel-powered RTG cranes.

In the example above, the combination of RTG crane 100 position errors from the steering system and from operator ability may exceed the positioning accuracy specification for cable placement. Accurate positioning of the RTG crane 100 relative to a cable trench 110 may therefore require specialized and costly position measurement and control equipment. Position measurement and control equipment for accurately guiding an RTG crane 100 along a selected path is known as a straight-steering system. Even for an RTG crane 100 equipped with an accurate straight-steering system, limitations in the speed with which position measurements are made and the speed and accuracy with which position errors are corrected may cause the RTG crane 100 to be operated at a speed lower than preferred for economical cargo operations.

What is needed is a means of connecting electrical power to an RTG crane without connecting and disconnecting high voltage cables during routine cargo transfer operations. What is also needed is a means of accurately guiding an RTG crane to achieve a selected high voltage cable placement without requiring an RTG crane straight-steering system.

SUMMARY

In one embodiment, an RTG crane is adapted to operate from a relatively low voltage supplied from a trolley, a relatively small cart electrically coupled to and moving in proximity to an RTG crane. A trolley for supplying electrical power to an RTG crane is also referred to herein as a power junction trolley. In some embodiments, the power junction trolley includes one or more drive motors for propulsion and, optionally, directional control. In other embodiments, the power junction trolley is towed by the RTG crane.

A high voltage cable couples power from an external Alternating Current (AC) high voltage power source, for example a shore power supply, to the input side of a step-down transformer mounted on the power junction trolley. The output of the step-down transformer is a relatively low AC voltage. The relatively low transformer output AC voltage is carried on a flexible power cable to an input electrical connection on the RTG crane, where the relatively low AC voltage is distributed to rectifiers, inverters, motor controllers, motors, and other equipment on board the RTG crane. In some embodiments, a power conversion circuit on the power junction trolley converts power having alternating current to power having direct current (DC). DC voltage and current from the power conversion circuit are coupled to a flexible power cable and then to the RTG crane.

The input side of the high voltage transformer on the power junction trolley ordinarily remains connected to shore power. An RTG crane equipped with a power junction trolley may therefore complete many maneuvers without interrupting a high voltage connection. For example, for a facility with multiple RTG lanes, a separate power junction trolley, may optionally be provided for each RTG lane. During a cross-lane maneuver, a flexible low voltage cable carrying the relatively low output voltage from a first power junction trolley on a first RTG lane is disconnected from an RTG crane and a flexible low voltage cable from a second power junction trolley is connected to the RTG crane after it enters a second RTG lane, without interrupting high voltage connections to either power junction trolley. Power for the cross-lane portion of the cross-lane maneuver may be supplied by a mobile source of power having a relatively low voltage. Other RTG crane maneuvers requiring separation of an RTG crane and a power junction trolley also require only the disconnection and reconnection of a relatively low voltage.

In some embodiments, a power junction trolley includes a cable reel for holding a portion of a high voltage cable. High voltage cable is wound onto the cable reel as the RTG crane and power junction trolley move together in a direction along the runways. High voltage cable is unwound from the reel and returned to a cable trench or other protective structure as the RTG crane and power junction trolley move together in an opposite direction along the runways. In other embodiments, the high voltage cable and cable reel are omitted and high voltage AC power is coupled to the input side of the transformer on the power junction trolley by a high voltage rail system located in a trench in the ground and non-contact power pick-ups located underneath or on a side of the power junction trolley.

By maintaining uninterrupted high voltage connections to a power junction trolley and accurately controlling the position of the power junction trolley relative to a cable trench or other high voltage cable protective structure, position control tolerances for an RTG crane coupled to the power junction trolley may be relaxed compared to control tolerances for RTG cranes known in the art. Position measuring and control equipment aboard the RTG crane may therefore be simpler and less costly. Furthermore, since a power junction trolley is smaller and lighter in weight than an RTG crane, the position of a power junction trolley is more easily controlled than the position of an RTG crane.

In some embodiments, a position of the power junction trolley relative to a cable trench is maintained accurately by causing the power junction trolley to follow a guide rail affixed to pavement near the trench. A pair of guide roller assemblies attached to opposite ends of the power junction trolley track along the guide rail to control a separation distance between the power junction trolley and the cable trench. In some embodiments the power junction trolley straddles the guide rail. Alternatively, the guide roller assemblies extend from a side of the power junction trolley and the power junction trolley travels on a path adjacent to the guide rail. In some embodiments, the high voltage cable is placed in a channel formed in the guide rail instead of in a trench. In some power junction trolley embodiments having on-board drive motors and a position controller, the position controller causes the power junction trolley to automatically track along a guide wire laid in a trench in the pavement. The position controller reads a position deviation signal from a magnetic or inductive sensor attached to the power junction trolley to determine the power junction trolley's position relative to the guide wire and the corresponding position of the power junction trolley relative to the cable trench. In other embodiments, a sensor on the power junction trolley detects a relative separation distance between the power junction trolley and a guide rail and a position controller on the power junction trolley controls drive motors on the power junction trolley to maintain the separation distance at a selected value.

Some RTG cranes include a diesel engine and an AC power generator driven by the diesel engine. An AC output of the power generator is converted to a DC voltage. The DC voltage from the power junction trolley, or alternately, the DC voltage from the engine, generator, and rectifier on the RTG crane, is distributed to other equipment on the RTG crane. The DC voltage may be converted back to an AC voltage by an inverter on the RTG crane, for example to provide power to an induction motor. A power junction trolley having a DC power output is advantageous for retrofitting an RTG crane having a diesel engine and an AC generator so that the RTG crane may operate from shore power without requiring an accurate straight-steering system.

Wheel position encoders, for example rotary encoders, are optionally installed between a drive motor and a wheel on some power junction trolley embodiments and some RTG crane embodiments. A position controller on the power junction trolley reads an output of a wheel position encoder and computes a position of the power junction trolley relative to an external reference point. A position controller on the RTG crane computes a corresponding position of the RTG crane. The position controller on the power junction trolley and the position controller on the RTG crane may optionally exchange position information. For example, in some embodiments the position of the power junction trolley is known to a higher degree of accuracy than the position of the RTG crane due to a position reference provided by a guide rail. The position reference supplied by the power junction trolley to the RTG crane may serve as a control input to position-computing equipment on the RTG crane, thereby simplifying the RTG crane control system and correspondingly reducing its cost and increasing its operating speed.

Embodiments of a power junction trolley having on-board drive motors may optionally have rubber tires. Some embodiments with rubber tires follow a guide rail or guide wire as previously described. Other embodiments with rubber tires measure a separation distance between the power junction trolley and an external structure as previously described. Other embodiments have metal flanged wheels and the power junction trolley is towed by the RTG crane along metal track rails affixed to the pavement or alternatively to channels in the pavement. The track rails are positioned parallel to a runway. Alternatively, a pair of track rails may optionally straddle a runway.

This section summarizes some features of the present embodiment. These and other features, aspects, and advantages of the embodiments of the invention will become better understood with regard to the following description and upon reference to the following drawings, wherein:

BRIEF DESCRIPTION OF THE DRAWINGS

FIG. 1 is representative of RTG cranes known in the art.

FIG. 6 shows an embodiment of a power junction trolley having a guiding apparatus comprising a guide roller assembly connected to a side of the power junction trolley. The illustrated embodiment shows a guide rail near the side of the power junction trolley and a high voltage cable positioned on the bottom of a channel formed in the guide rail.

FIG. 7 shows an embodiment of a power junction trolley straddling a cable trench formed in pavement. A high voltage cable is positioned in the cable trench.

FIG. 8 shows a power junction trolley having flanged metal wheels running on metal track rails installed in pavement. A high voltage cable is shown in the trench adjacent to one of the track rails. A track rail is shown on either side of a runway.

FIG. 9 illustrates a power junction trolley adapted to receive high voltage input power from two high voltage conductors attached to rails installed in a trench in the pavement. A non-contact power coupler for receiving power from the high voltage conductors is shown attached to a frame member on the power junction trolley.

FIG. 11 is a simplified block diagram of a power junction trolley having two position sensors and associated sensor interfaces communicating with a position controller. The figure shows a first separation distance between a first sensor and an extended guide rail and a second separation distance between a second sensor and the rail. A selected direction of travel parallel to the guide rail is also indicated.

FIG. 12 illustrates a deviation angle between the selected direction of travel and an actual direction of travel for the power junction trolley of FIG. 11.

DESCRIPTION

Embodiments of the present invention include an apparatus for powering a rubber tire gantry crane (RTG crane) from shore power from a relatively low voltage, thereby enabling an RTG crane to be disconnected from a source of electrical power and reconnected to another source of electrical power without interrupting a high voltage cable connection. Some embodiments place a high voltage cable accurately in a selected location as the embodiment traverses a selected path. Other embodiments accurately follow a stationary high voltage conductor, for example a high voltage cable or a high voltage rail, and receive energy from the high voltage conductor by inductive coupling. Other embodiments accurately follow a rail carrying high voltage electrical current and couple electrical energy from the rail to the RTG crane. Some embodiments of the invention are well adapted for use with new RTG cranes and others are well adapted for retrofit of existing RTG cranes. Some embodiments include an RTG crane adapted for operation from a source of electrical power having a relatively low voltage.

A magnitude of a voltage deemed to be a high voltage may vary from location to location according to local requirements, for example safety regulations, labor practices, and so on. High voltage is therefore used herein to mean a voltage having a magnitude equal to or greater than a threshold voltage above which connections must be made or broken by personnel with special training. A voltage having a magnitude less than such a threshold voltage is referred to herein as a low voltage or alternately as a relatively low voltage.

Figure 3:
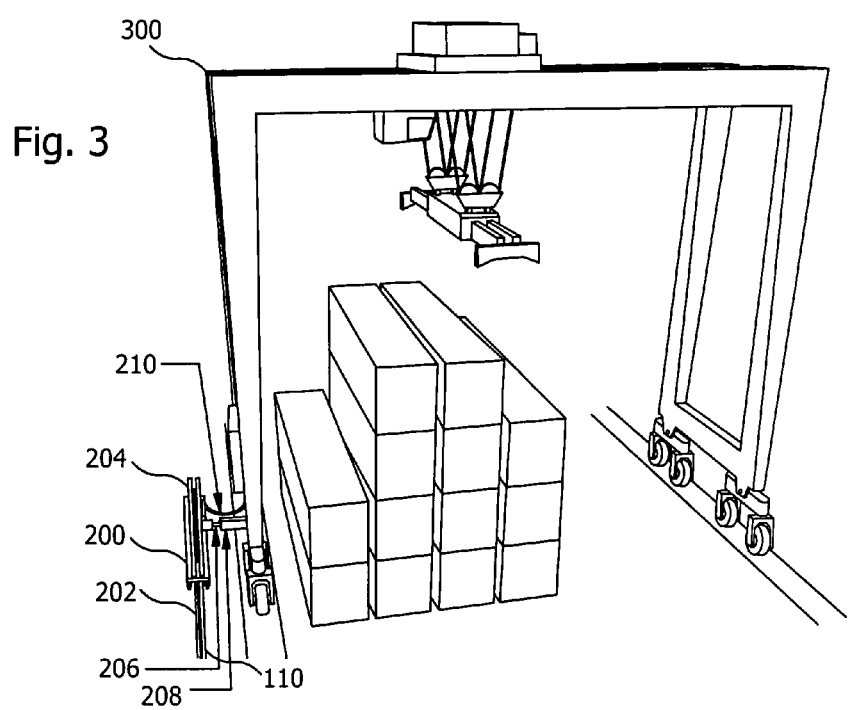
FIG. 3 is a pictorial view of an RTG crane in accord with the present invention. The RTG crane of FIG. 3 is adapted to receive electrical power having a relatively low voltage from a power junction trolley connected to a high voltage cable.

An embodiment of an RTG crane adapted for operation from a low voltage is shown in FIG. 3. In the embodiment of FIG. 3, a power junction trolley 200 is mechanically and electrically connected to an RTG crane 300 adapted to operate from a low voltage power source in accord with the present invention. The power junction trolley 200 may optionally be installed on either the left side or the right side of the RTG crane 300 according to the needs of a particular freight terminal. In other embodiments, the power junction trolley may optionally be in front of or behind the RTG crane 300.

In the embodiment of FIG. 3, the power junction trolley 200 is towed by the RTG crane 300 along a guide rail 202. A draw bar 206 having a hinged connection to the power junction trolley 200 engages a draw bar receiver 208 attached to a structural member on the RTG crane 300. A sliding engagement between the draw bar 205 and draw bar receiver 208 permits a separation distance between the power junction trolley 200 and the RTG crane 300 to vary over a selected range. For example, in some embodiments the separation distance may vary by about ten inches from a reference position.

Electrical power connections to the RTG crane 300 are made through the power junction trolley 200. A high voltage cable carries electrical power from an external power supply to the power junction trolley 200. Some of the high voltage cable rests in a cable trench 110 and some of the high voltage cable is collected on a cable reel 204 attached to the power junction trolley 200. A rotating electrical contact on the hub of the cable reel connects high voltage electrical power to distribution wiring on the power junction trolley and then to the input side of a high voltage transformer mounted on the power junction trolley. A low voltage output from the high voltage transformer is coupled to a flexible power cable 210 which is connected to a power input terminal on the RTG crane 300.

Figure 1:
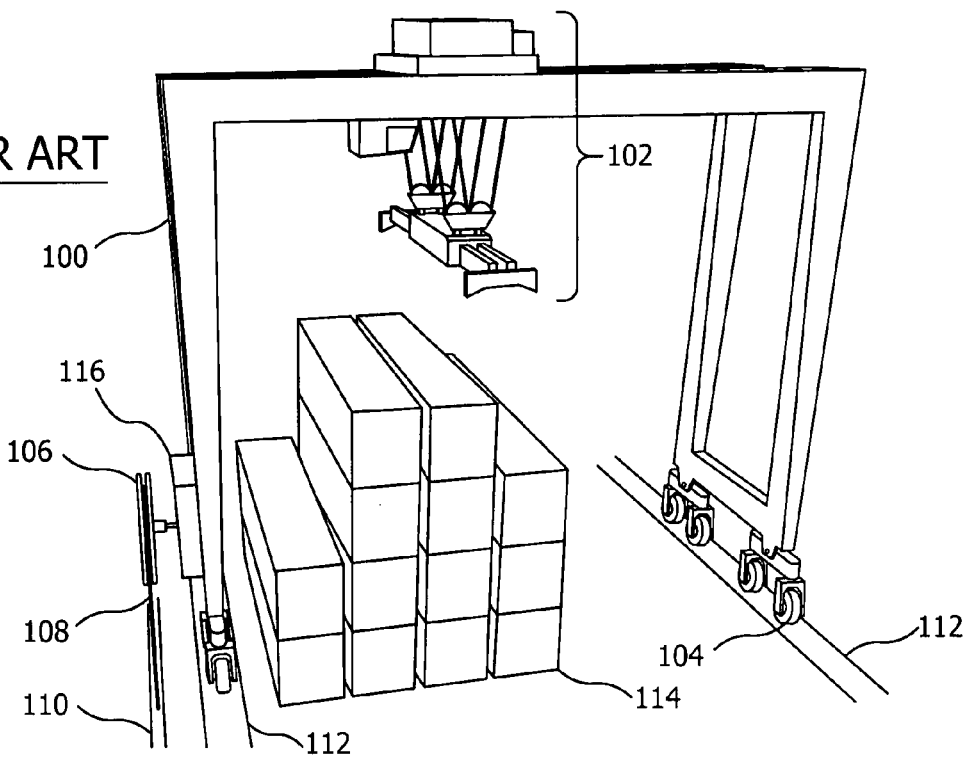
FIG. 1 is a pictorial view of a rubber tire gantry (RTG) crane powered from a high voltage cable connected to the RTG crane.
Figure 2:
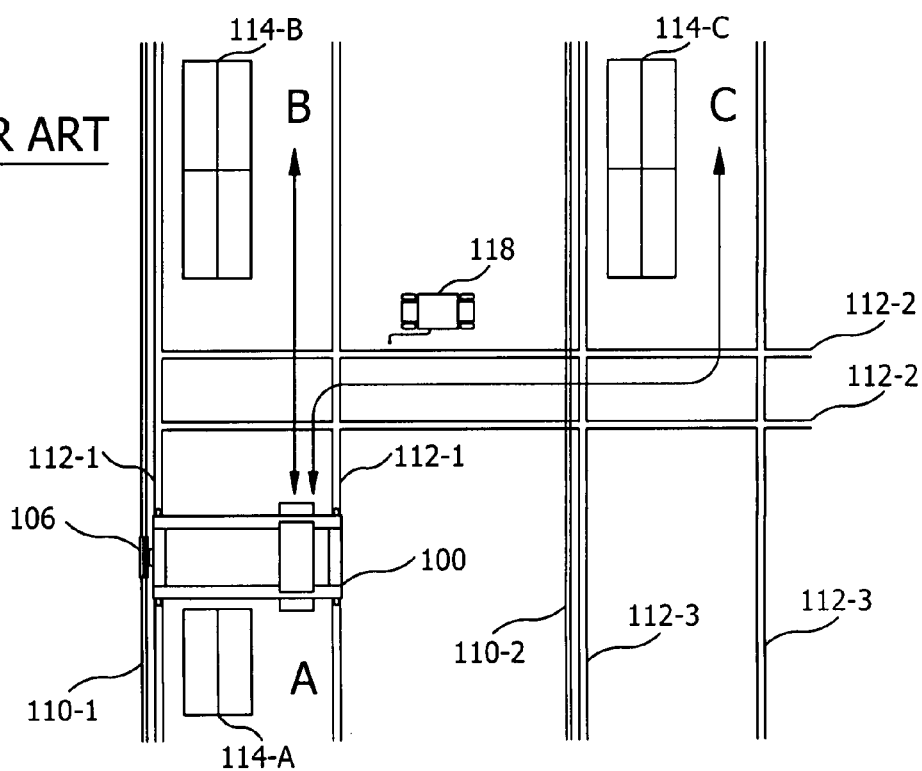
FIG. 2 is an overhead view of a cross-lane maneuver to be performed by the RTG crane of FIG. 1.

Referring to FIG. 1, note that a high voltage transformer 116 and a crane-mounted cable reel 106 are located on the RTG crane 100. This configuration is well known in the art and requires the RTG crane to track accurately along the path of the cable trench 110 to place the high voltage cable 108 in a selected position in the bottom of the trench, as previously discussed. Moving the RTG crane 100 of FIG. 1 away from the cable trench 110, for example to perform a cross-lane maneuver, requires the high voltage connection to the RTG crane 100 of FIG. 1 to be interrupted. In comparison, the power junction trolley 200 in FIG. 3 remains connected to the high voltage cable throughout ordinary cargo transfer operations, including cross-lane maneuvers and other RTG crane movements wherein an RTG crane 300 in accord with the present invention is separated from the power junction trolley. When the RTG crane 300 of FIG. 3 is separated from the power junction trolley 200, the low voltage output from the power junction trolley 200 on flexible power cable 210 is interrupted. Power connections to an RTG crane 300 connected to various embodiments of the present invention may therefore be made without using personnel specially trained in high voltage operations. Furthermore, by tracking accurately along a selected path defined by the guide rail 202, the power junction trolley 200 accurately places a high voltage cable in a selected position, while the RTG crane 300 is free to traverse along a runway with a much larger amount of allowable position error. An RTG crane 300 receiving power from a power junction trolley 200 therefore does not require a high-accuracy straight-steering system to maintain connections to a power source.

Figure 4:
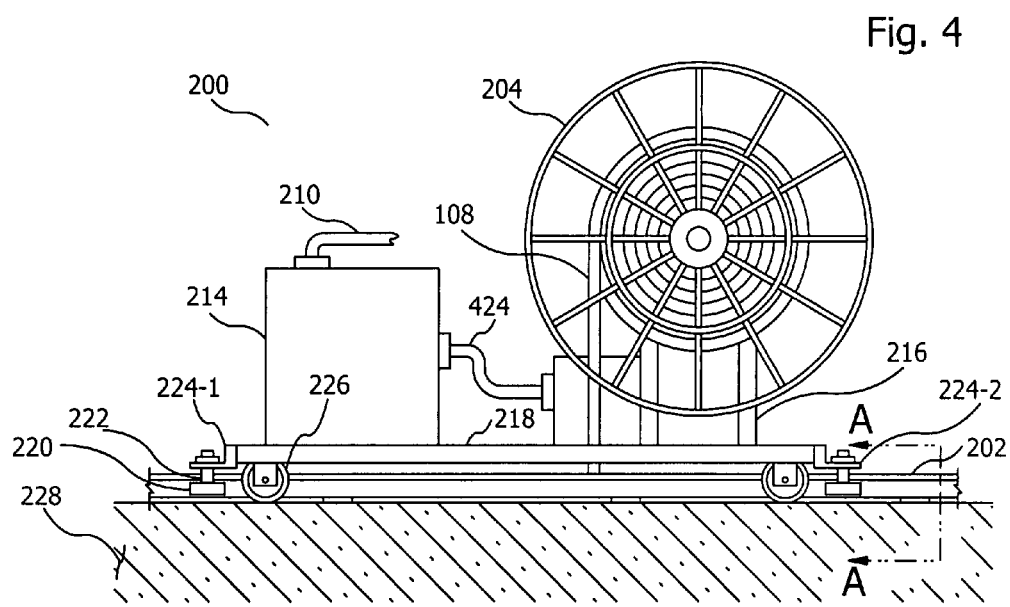
FIG. 4 is side view of an embodiment of a power junction trolley and an embodiment of a guide rail on pavement.
Figure 5:
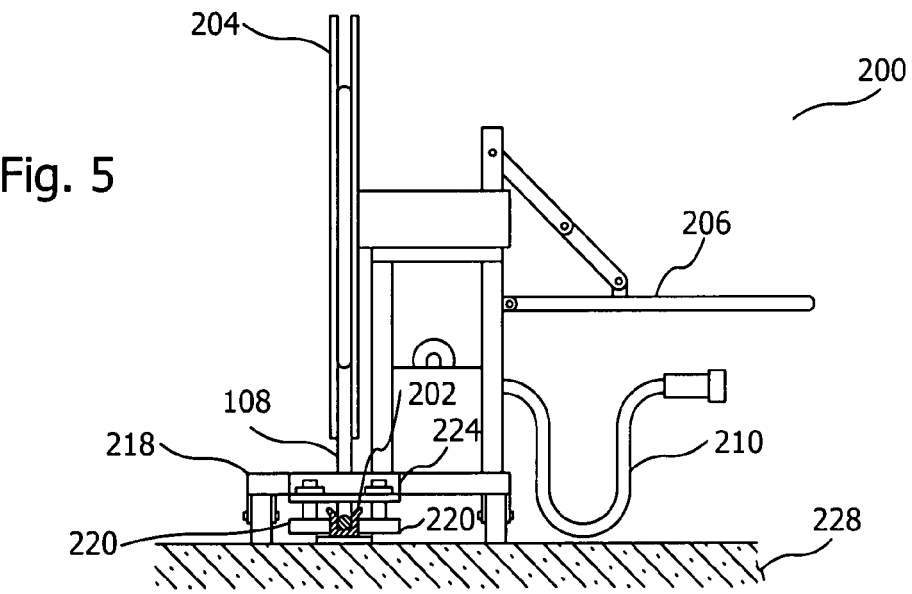
FIG. 5 is an end view of the power junction trolley embodiment of FIG. 4, further illustrating a draw bar for mechanically coupling the power junction trolley to an RTG crane and a flexible power cable for electrically coupling the power junction trolley to the RTG crane.

The power junction trolley 200 from the embodiment of FIG. 3 is shown in more detail in FIG. 4 (side view) and FIG. 5 (end view). Trolley wheels 226 rotatably connected to a power junction trolley 200 rest on a surface of pavement 228. In the embodiment of FIG. 4 and FIG. 5, the power junction trolley 200 comprises at least one frame member 218 and at least one structural support 216 connected to the frame member 218. A high voltage transformer 214 is attached to the frame member 218 and a cable reel 204 is rotatably connected to the structural support 216. A high voltage cable 108 couples high voltage shore power through a rotating power coupler on the cable reel 204 to a high voltage transfer cable 424 aboard the power junction trolley 200. High voltage on the transfer cable 424 is connected to an input of the high voltage transformer 214. High voltage transformer 214 is a step-down transformer, the output of which is a low voltage. The low voltage output from the high voltage transformer 214 is coupled to a flexible power cable 210. Flexible power cable 210 is adapted for connection to a low voltage power input connection on an RTG crane.

The power junction trolley 200 of FIG. 4 and FIG. 5 achieves a selected positioning accuracy by tracking along a guide rail 202. The guide rail 202 is firmly attached to the pavement 228. A variation in straightness of a vertical side of the guide rail 202 contributes an error factor to the positioning accuracy of the power junction trolley 200. A guiding device maintains a selected separation between the guide rail 202 and a part of the power junction trolley 200. In the embodiment of FIG. 4 and FIG. 5, the guiding device comprises a first power junction trolley guide roller assembly 224-1 attached to an end of the power junction trolley 200 and a second power junction trolley guide roller assembly 224-2 attached to an opposite end of the power junction trolley 200. A guide roller assembly 224 comprises at least two guide rollers 220, each guide roller rotatably connected to a guide roller assembly 224. A first guide roller 220 contacts a first vertical side of the guide rail 202 and a second guide roller 220 contacts a second vertical side of the guide rail 202. The guide rollers 220 cause the power junction trolley 200 to closely follow a path defined by the guide rail 202. In some embodiments, the power junction trolley straddles the guide rail, and in other embodiments the power junction trolley tracks next to the guide rail. In the illustrated embodiment, the guide rollers 220 and guide rail 202 are made from a metal, for example, steel. It is preferred that embodiments of the guide rail have sufficient strength to limit flexure to an amount that is much less than a desired position tolerance of the power junction trolley.

In some of the embodiments described above, the high voltage cable rests in a cable trench to protect the cable from damage and to protect personnel and equipment from high voltage. FIG. 5 shows another option for a position of the high voltage cable. In FIG. 5, a portion of the high voltage cable 108 is wound on the cable reel 204 as previously described. The high voltage cable 108 passes through an aperture in the power junction trolley 200 and into a space under the power junction trolley, where a portion of the cable rests in a channel formed in an upper surface of the guide rail 202. A cross section of the high voltage cable 108 and a cross section of the guide rail 202 are visible between the pair of guide rollers 220 in FIG. 5.

Figure 6:
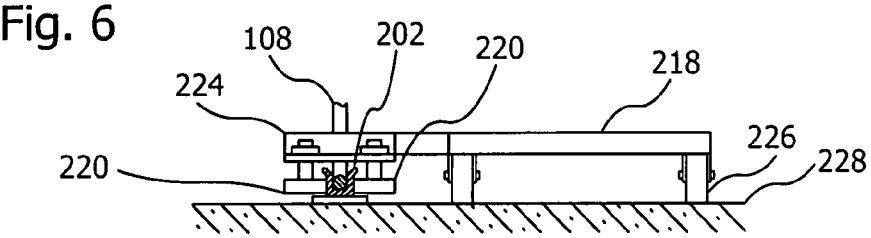
FIG. 6, FIG. 7, FIG. 8, and FIG. 9 are alternative embodiments of the lower portion of a power junction trolley. The viewing direction for these partial section views is shown by a line marked A-A in FIG. 4.

FIG. 6, FIG. 7, FIG. 8, and FIG. 9 show different embodiments of the lower portion of a power junction trolley 200 as viewed in the direction shown by the partial section line marked A-A in FIG. 4. Elements above the section line A-A in FIG. 4 may be considered to be adaptable to all of the embodiments illustrated in FIG. 6 to FIG. 9. In the embodiment of FIG. 6, the high voltage cable passes along a side of the power junction trolley instead of being straddled by the power junction trolley. Two wheels 226 and a frame member 218 indicate the position of the main part of the power junction trolley relative to the guide rail 202. The guide rail 202 is formed with a channel in which the high voltage cable 108 is placed (or alternately from which the cable is withdrawn) as the power junction trolley traverses. The guide roller assembly 224 is connected on a side of the power junction trolley to a frame member 218 and the guide rollers 220 track along the sides of the guide rail as described above.

Figure 7:
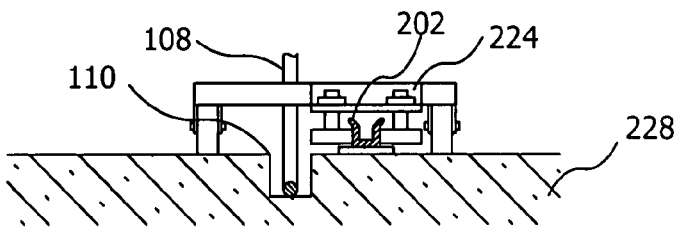

In the embodiment of FIG. 7, part of the high voltage cable is laid in a cable trench 110 formed in the pavement 228. The power junction trolley straddles the cable trench 110. A separation distance between the cable trench 110 and the guide rail 202 is selected so as to cause the high voltage cable 108 to be laid in the trench as the power junction trolley moves along the guide rail. At least two guide roller assemblies 224 cause the power junction trolley to accurately follow a path defined by the guide rail 202. The embodiment of FIG. 6 may also be adapted to place the high voltage cable in a trench as in FIG. 7.

Figure 8:
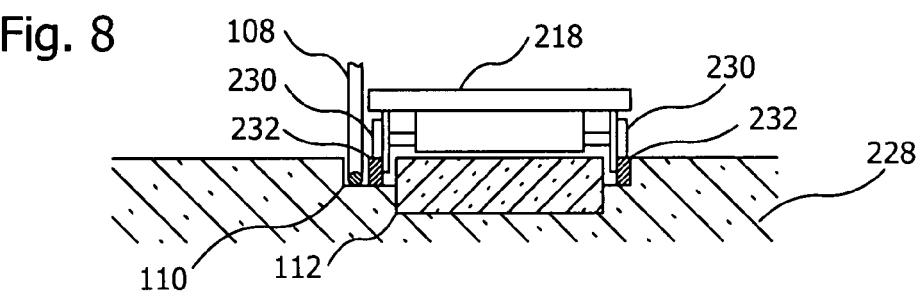
Figure 9:
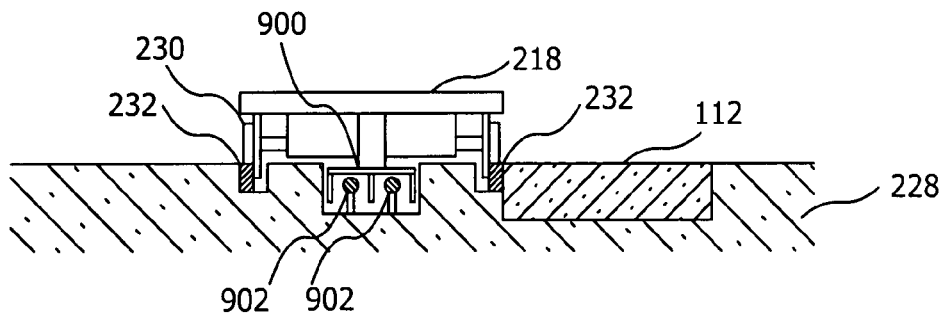

In some embodiments, the power junction trolley traverses on a pair of parallel metal rails similar to train tracks. In the embodiment shown in FIG. 8, a pair of track rails 232 is located in trenches formed in the pavement 228. The track rails 232 are on opposite sides of a runway 112. Alternatively, the track rails 232 may both be located on a same side of a runway 112, as shown in FIG. 9. Flanged wheels 230 adapted for rolling on the track rails 232 are rotatably coupled to a frame member 218. In the embodiment of FIG. 8, the power junction trolley is pulled behind (or alternately pushed in front of) the RTG crane. One of the pavement trenches in FIG. 8 holds a track rail 232 and further serves as a cable trench 110 into which the high voltage cable 108 is placed. The high voltage cable 108 may optionally be placed in a separate trench. The embodiments of FIG. 6 and FIG. 7 may also be adapted to straddle a runway as in FIG. 8. A power junction trolley having flanged wheels and rolling on track rails may also be adapted to the high voltage cable locations, optionally with a guide rail, as in FIG. 6 and FIG. 7.

High voltage may be coupled to a power junction trolley by means other than a high voltage cable. In FIG. 9, two high voltage conductors 902 are placed in a trench formed in the pavement 228. The high voltage conductors 902 are connected to a source of high voltage AC power having a voltage, a current, and a frequency selected for efficiency of inductive coupling to a power junction trolley and for powering an RTG crane. A non-contact power coupler 900 attached to a frame member 218 on the power junction trolley moves next to and along the high voltage conductors 902 as the power junction trolley moves along the track rails 232. Power is coupled inductively from the high voltage conductors 902 to the power coupler 900 and from there to the inputs of a high voltage transformer on the power junction trolley. A power junction trolley equipped with an inductive power coupler does not require a cable reel or a long high voltage cable to connect to an external high voltage power supply. However, the non-contact power coupler 900 must closely follow the high voltage conductors 902 without contacting the conductors, so this embodiment uses flanged wheels 230 on track rails 232 to implement accurate position control.

It is well within the capability of a large RTG crane to tow a power junction trolley as the RTG crane moves itself and its burden of cargo along an RTG lane. In some embodiments, the RTG crane pulls or pushes the power junction trolley in front of or alternately behind the RTG crane using conventional towing equipment. In other embodiments, the power junction trolley is pushed along from a side of the RTG crane, as shown in FIG. 3. A drawbar arrangement for towing the power junction trolley from a side of the RTG crane is shown in the end view of a power junction trolley in FIG. 5. A drawbar 206 having a pivoted attachment to a part of the power junction trolley 200 and supported by a hinged linkage connected to another part of the power junction trolley is shown in an extended position in FIG. 5. The drawbar 205 in the illustrated embodiment may be rotated to a vertical position to move it out of the way of other equipment or to prevent personnel from bumping into the drawbar when the power junction trolley 200 is not in use. The drawbar receiver on the RTG crane is adapted to exert a force on the drawbar 205 to move the power junction trolley forward or backward in response to a corresponding motion of the RTG crane. The drawbar receiver on the RTG crane is also adapted to permit a variation in a separation distance between the power junction trolley and RTG crane. The separation distance varies partly as a consequence of a difference in guiding accuracy between the power junction trolley and RTG crane.

Figure 10:
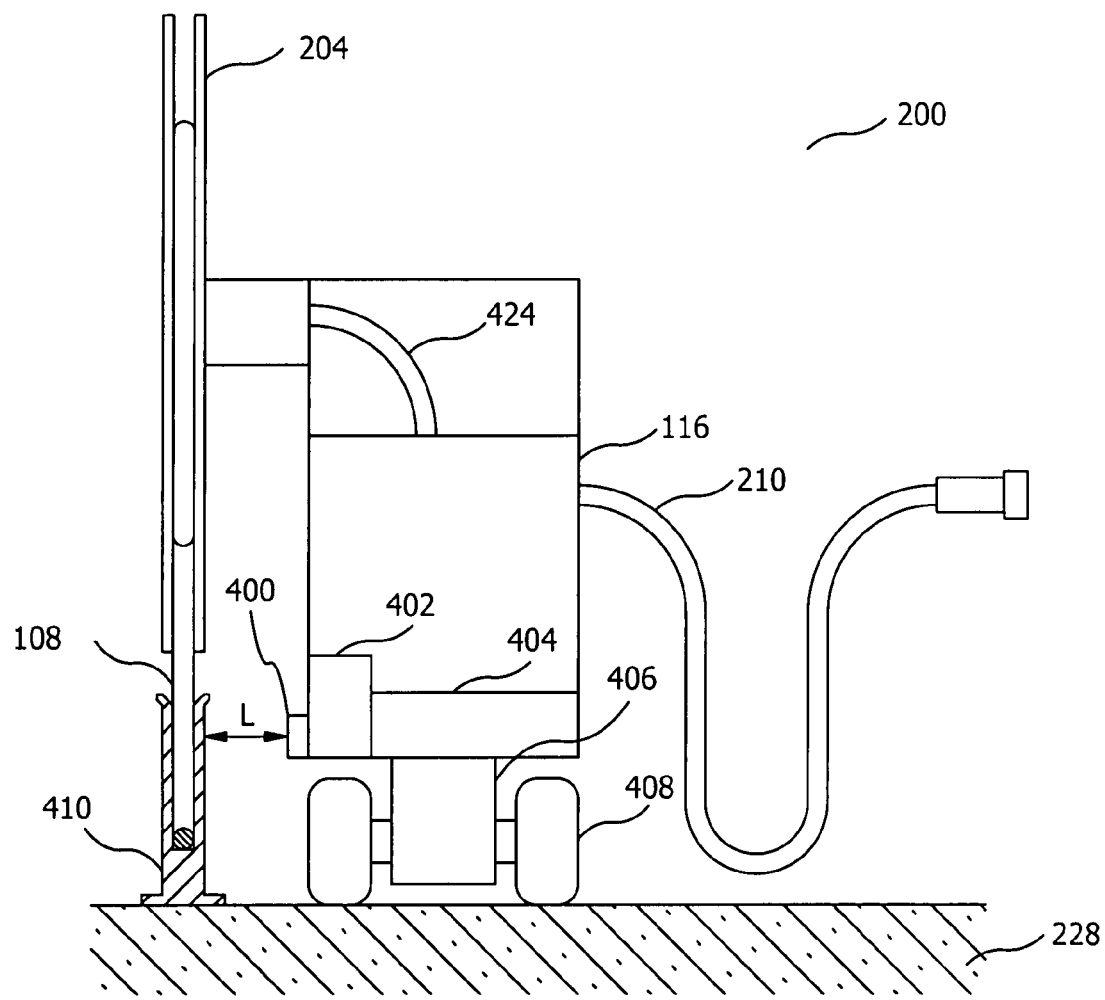
FIG. 10 is a simplified block diagram of a power junction trolley having rubber tires driven from electric motors. A selected separation distance between the power junction trolley and a guide rail is marked in the figure.

In some embodiments, a power junction trolley is not towed by an RTG crane but is instead equipped with a drive motor coupled to one or more power junction trolley wheels to propel the power junction trolley forwards and backwards along a selected path. A simplified block diagram of a power junction trolley having a drive motor is shown in FIG. 10. The embodiment of FIG. 10 comprises a power junction trolley 200 having four rubber tires 408, at least one of which is coupled to an electric drive motor 406. A position controller 404 exchanges signals with the drive motor 406 to control a direction of travel and a rate of travel of the power junction trolley 200. A position controller 404 may comprise, for example, a programmable logic controller, a microprocessor, a microcomputer, a microcontroller, or any other preferred hardware and optionally software for automatically controlling the value of a selected parameter within selected limits. In some embodiments, the power junction trolley has more than one drive motor 406 under control by the position controller 404 so that the position controller 404 may change a direction of travel of the power junction trolley 200. Alternatively, the position controller 404 exchanges control signals with a steering actuator coupled to one or more drive wheels to change a direction of travel.

A cable reel 204 rotatably attached to the power junction trolley 200 in FIG. 10 holds a portion of the high voltage cable 108. Another portion of the high voltage cable 108 rests in a channel formed in a guide rail 410. A high voltage transfer cable 424 connects high voltage from the cable reel 204 to high voltage inputs on a high voltage transformer 116. An output of the high voltage transformer 116 is a low voltage on a flexible power cable 210. The flexible power cable 210 is connected to a power input terminal on the RTG crane.

The guide rail 410 shown in FIG. 10 has an extended height compared to the guide rail 202 in FIG. 5. The extended guide rail 410 may provide more protection and isolation of a high voltage cable 108 compared to the guide rail 202 in FIG. 5. The sides of the extended guide rail 410 may also be used as a position reference for one or more position sensors. As shown in FIG. 10, a position sensor 400 measures a separation distance "L" between the sensor 400 and the extended guide rail 410. A position sensor may be, for example, an acoustic distance-measuring sensor, an optical distance-measuring sensor, a Hall-effect sensor, a pressure sensor having a probe for contact measurement, or other types of sensors. A sensor output signal is coupled to a sensor interface module 402 which has an output connected to an input of the position controller 404. An output signal from the sensor interface module 402 may be, for example, a position error signal proportional to a deviation from a selected value of the distance "L". Alternatively, the output signal may be a value representative of the distance "L". The position controller 404 determines a value of the sensor interface module 402 output signal and may accordingly issue control signals to one or more drive motors 406 or alternatively to a steering actuator to change a direction of travel of the power junction trolley 200.

Some embodiments comprise an optional second position sensor to provide additional information about a position of a power junction trolley. For example, the power junction trolley embodiment of FIG. 11 comprises a first position sensor 400 having an output connected to a first sensor interface module 402 and a second position sensor 420 having an output connected to a second sensor interface module 422. The first position sensor 400 is located near an end of the power junction trolley 200 and the second position sensor 420 is located near an opposite end of the power junction trolley 200. The position sensors may optionally be located elsewhere on the power junction trolley 200. The first position sensor interface module 402 has an output signal having a value corresponding to a value of a separation distance L1 between the sensor 400 and the extended guide rail 410. The second position sensor interface module 422 has an output signal having a value corresponding to a value of a separation distance L2 between the sensor 420 and the extended guide rail 410. The outputs of the first and second sensor interface modules are connected to inputs of a position controller 404. The position controller 404 computes values corresponding to the distances L1 and L2 and determines an amount of error between the path of the power junction trolley 200 and a selected path of the power junction trolley 200. The selected path of the power junction trolley 200 is indicated by an arrow marked D1 in FIG. 11 and FIG. 12. In the embodiment of FIG. 11 and FIG. 12, the selected path D1 is parallel to the extended guide rail 410.

As shown in FIG. 12, the position controller 404 may optionally compute a value for a deviation angle A1 from distances L1 and L2. The deviation angle A1 corresponds to an angle between a direction of travel of the power junction trolley 200, indicated in FIG. 12 by an arrow labeled D2, and the extended guide rail 410. Angle A1 further corresponds to an angle between the power junction trolley direction of travel D2 and the selected power junction trolley direction of travel D1 for a selected direction of travel parallel to the extended guide rail 410. A power junction trolley 200 having two position sensors and equipped to determine separation distances L1, L2, and deviation angle A1 may follow a selected path with greater accuracy than a power junction trolley having only one position sensor. The power junction trolley 200 of FIG. 11 and FIG. 12 may also place a high voltage cable in a cable trench with greater accuracy than a power junction trolley equipped with only one position sensor. The ability to compute a deviation angle A1 may have further advantages in detecting error conditions in the operation of the power junction trolley 200, for example, systematic guiding errors, partial loss of drive wheel traction, course disturbances from external causes such as wind or impact with foreign objects, uneven pavement surfaces, and other errors. Upon detecting an error condition, the position controller 404 may optionally issue instructions to halt the motion of the power junction trolley or RTG crane or take other actions.

Figure 13:
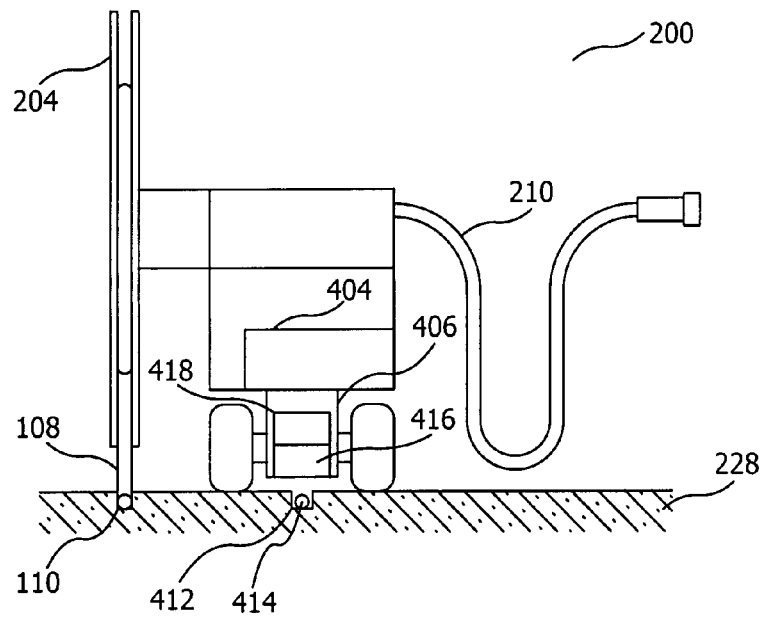
FIG. 13 is a simplified representation of an embodiment of a power junction trolley having motors for self-propulsion and a guiding apparatus for automatically following a guiding signal on a guide wire in a guide wire trench so as to accurately place a high voltage cable in a cable trench.

An alternative means of controlling the position of a power junction trolley is to adapt the power junction trolley to follow a tracking signal emanating from a guide wire located in a trench formed in the pavement. An example of a power junction trolley equipped to follow a guide wire is shown in FIG. 13. The embodiment of FIG. 13 comprises a cable reel 204, a high voltage cable 108, a flexible power cable 210, a drive motor 406, and a position controller 404, all corresponding to elements in other embodiments already described. A portion of the high voltage cable 108 may be placed in a cable trench 110 as shown in FIG. 11, or alternately in an embodiment of a guide rail as in FIG. 5 or FIG. 10. A guide wire 414 is placed in a guide wire trench 412 in the pavement 228. The guide wire 414 defines a path to be followed by the power junction trolley 200. A guide signal sensor 416 detects a signal emanating from the guide wire 414. An output signal from the guide signal sensor 416 is input to a guide sensor interface module 418. A preferred output from the guide sensor interface module 418 is a position signal having a magnitude inversely proportional to a separation distance between the guide signal sensor 416 and the guide wire 414. The position controller 404 determines a magnitude of the position signal and issues control signals to change a direction of travel of the power junction trolley 200 so as to maintain the magnitude of the position signal at its maximum value, corresponding to the power junction trolley closely following a selected path.

Figure 14:
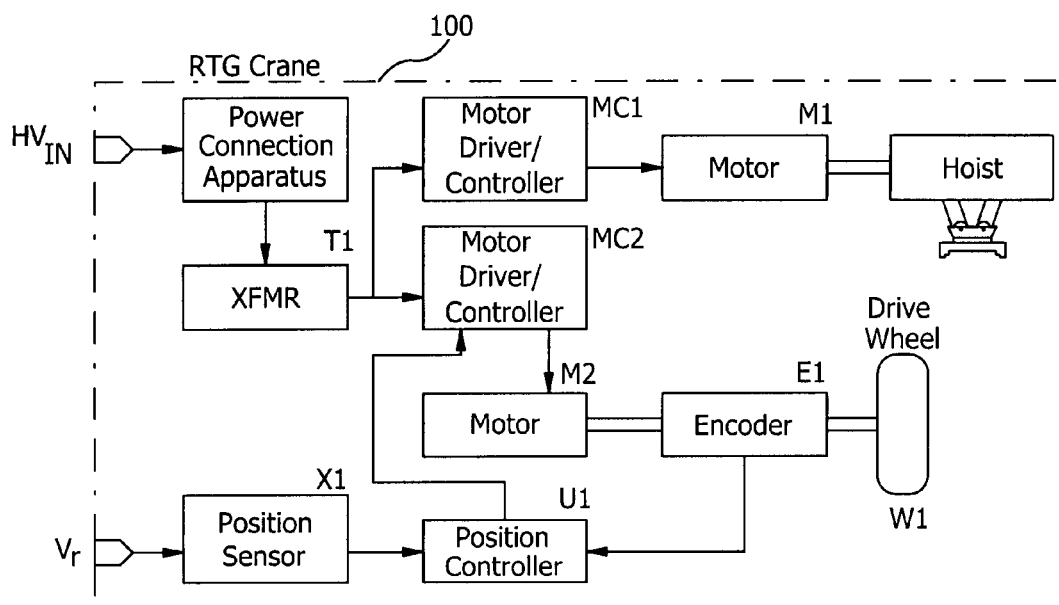
FIG. 14 is a block diagram of some of the power distribution and position control equipment aboard an RTG crane known in the art.

An RTG crane having an on-board high voltage transformer connected to an external high voltage source by a high voltage cable, as shown in FIG. 1, was previously described as known in the art. A block diagram showing a simplified representation of power connections in the RTG crane of FIG. 1 are shown in FIG. 14. In FIG. 14, a source of high voltage power comprising an AC voltage is coupled at an input terminal $HV_{IN}$ to a power connection apparatus comprising a high voltage cable, a cable reel, and a rotating power coupler from the cable reel to an electrical distribution system on the RTG crane. An output from the power connection apparatus is connected to a high voltage input on a transformer T1. As previously explained for an RTG crane 100 known in the art, a high voltage connection is made directly to the RTG crane 100 and the power connection apparatus and the high voltage transformer T1 are part of the RTG crane 100. A low voltage AC output from the transformer T1 is connected to an input of a first motor driver/controller MC1 and to an input of a second motor driver/controller MC2.

A motor driver/controller is defined herein as a combination of analog and digital circuits used to transform input voltage and current into a form suitable for powering an electric motor and automatically controlling the rotating speed and rotating direction of the motor. For example, a motor driver/controller may optionally comprise a rectifier, an inverter, or other power-controlling or power-transforming components. One skilled in the art will recognize that the physical locations and functional segmentation of the various elements comprising a motor driver/controller will vary according to the requirements of a specific power junction trolley and RTG crane configuration.

Continuing with FIG. 14 for an RTG crane 100 known in the art, an output of a motor driver/controller MC1 is connected to an input of a motor M1 which operates a hoist on the RTG crane 100. An output of another motor driver/controller MC2 is connected to an input of a motor M2 having a drive shaft coupled to a drive wheel W1. An encoder E1 connected to the drive shaft of the motor M2 has an output signal that represents the rotational position of the drive wheel W1, from which a distance traveled by the drive wheel W1 may be calculated. The wheel position signal output from encoder E1 is an input to position controller U1. A position sensor interface circuit X1 receives a position reference signal on terminal Vr from, for example, a Differential Global Positioning System (DGPS) receiver or another high-accuracy position sensing device. Position information from the position sensor X1 is connected to an input of position controller U1. The position controller U1 uses the information from the encoder E1 and the position sensor X1 to accurately establish a location of the RTG crane relative to a selected position, such as the position of a cable trench, and then issues corrective steering commands to move the RTG crane on a selected path.

Figure 15:
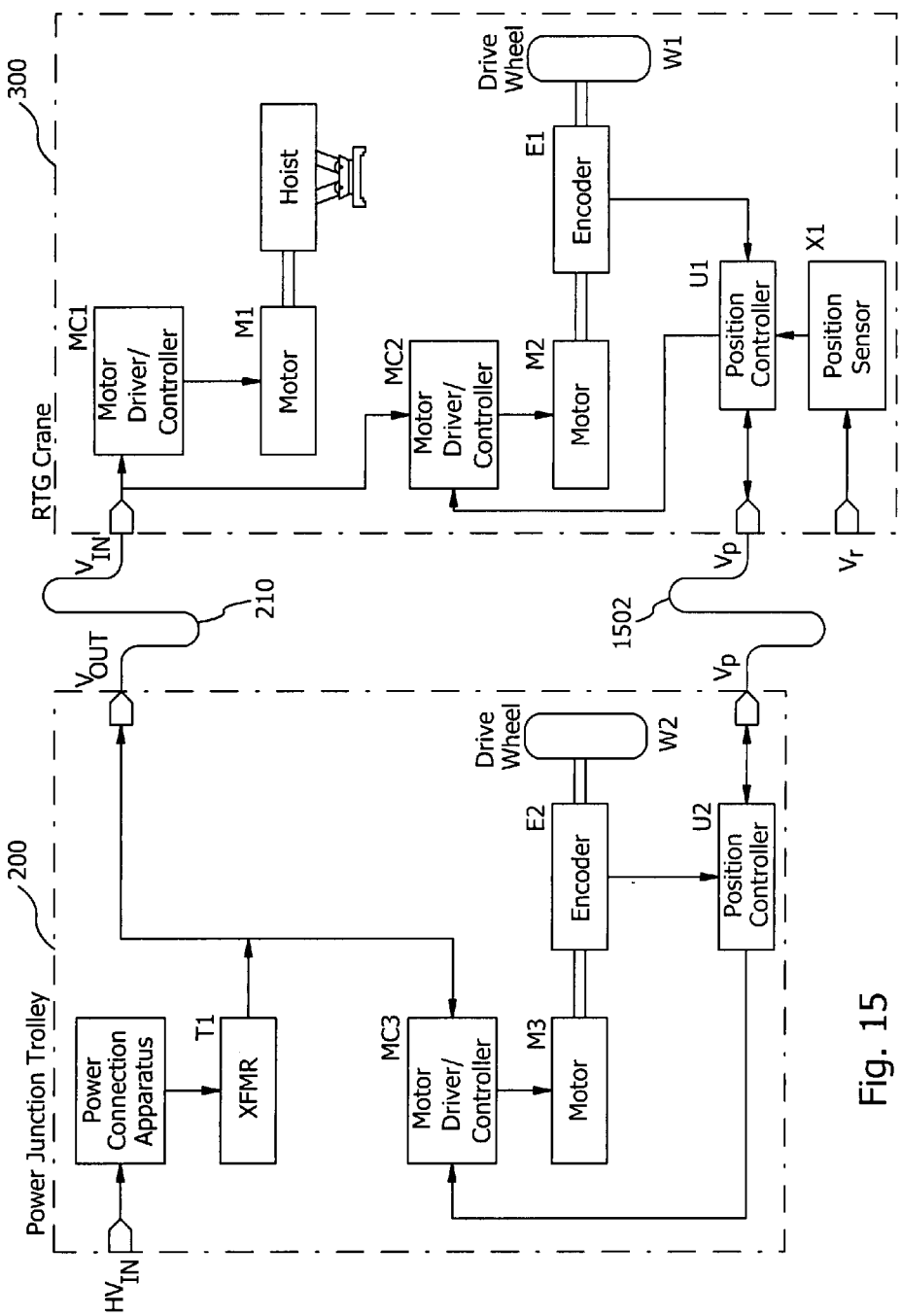
FIG. 15 illustrates an embodiment of a power junction trolley adapted to provide DC output power and an embodiment of an RTG crane adapted in accord with the present invention to receive DC input power from a power junction trolley.

A block diagram showing power connections for an embodiment of the present invention wherein an RTG crane is supplied by low voltage AC power from a power junction trolley, for example the embodiment of FIG. 4, is shown in FIG. 15. In FIG. 15, equipment installed on the power junction trolley is grouped within the box labeled power junction trolley 200 and equipment installed on the RTG crane is grouped within a box labeled RTG crane 300. A source of high voltage AC power, for example shore power, is coupled to a voltage input terminal $HV_{IN}$ on the power junction trolley 200 and then to a power connection apparatus such as a high voltage cable on a cable reel or a non-contact high voltage power coupler. An output from the power connection apparatus is connected to a high voltage input on a high voltage step-down transformer T1. A low voltage AC output from the transformer T1 is coupled to an output terminal $V_{OUT}$ on the power junction trolley 200 and carried by a flexible power cable 210 to a power input terminal $V_{IN}$ on the RTG crane 300.

In some embodiments, the power junction trolley 200 has an on-board drive motor for propulsion independent of an RTG crane. Power and control connections for a drive motor are shown in the power junction trolley 200 block in FIG. 15. The low voltage AC output from the transformer T1 on the power junction trolley 200 is connected to an input of a motor driver/controller MC3. Power and control outputs from the motor driver/controller MC3 are connected to corresponding inputs on a drive motor M3. A drive shaft from the drive motor M3 turns a drive wheel W2. A wheel position encoder E2 coupled to the shaft of the drive motor M3 produces an output signal corresponding to a rotational position of the drive wheel W2, from which a distance traveled by the wheel W2 may be calculated. A position controller U2 uses the position data from encoder E2 to determine a position for the power junction trolley 200. The position controller U2 may optionally use signals from other sensors to perform additional calculations related to the position of the power junction trolley 200 as previously described. In some embodiments, the position controller U2 uses the position it determines to change a direction of travel of the power junction trolley 200 and cause the power junction trolley 200 to follow a selected path. In other embodiments, the position controller U2 reports its position data on a data terminal Vp on the power junction trolley 200. An output from the position controller U2 is connected as a control input to the motor driver/controller MC3 to establish closed-loop control of the drive wheel W2.

A flexible signal cable 1502 couples position data, or alternately a signal representative of position data, from the data terminal Vp on the power junction trolley 200 to a corresponding data terminal Vp on the RTG crane 300 and then to a position controller U1 on the RTG crane 300. In some embodiments, position data from the power junction trolley 200 is an input factor in controlling a position of the RTG crane 300. In some embodiments, the exchange of position signals between the power junction trolley 200 and the RTG crane 300 is bidirectional. Such bidirectional exchange of position information may be advantageous for detecting errors in the movement or position of the power junction trolley 200 or RTG crane 300, for example detecting a collision with an obstacle.

Continuing with FIG. 15, low voltage AC output power from the output terminal $V_{OUT}$ on the power junction trolley 200 is coupled to a voltage input terminal $V_{IN}$ on the RTG crane 300 by a flexible power cable 210. When it becomes desirable to separate the power junction trolley 200 and the RTG crane 300 from each other, for example to perform a cross-lane maneuver, only low voltage cables (the flexible power cable 210 and the flexible signal cable 1502) are disconnected and reconnected. High voltages present at $HV_{IN}$ on the power junction trolley 200 remain connected to the power junction trolley during normal RTG crane cargo transfer operations.

As shown in FIG. 15, low voltage AC power on the RTG crane 300 voltage input terminal $V_{IN}$ is coupled to an input of a first motor driver/controller MC1 having outputs connected to a first motor M1 used to operate a hoist on the RTG crane 300. Low voltage AC power is also coupled to a second motor driver/controller MC2 having outputs connected to a second motor M2 which turns a drive wheel W1 to propel the RTG crane 300. An encoder E1 connected to the drive shaft of the second motor M2 has an output signal that represents the rotational position of the drive wheel W1, from which a distance traveled by the wheel W1 may be calculated. The wheel position signal output from encoder E1 is an input to a position controller U1. A second position sensor interface circuit X1 receives a position reference signal on terminal Vr from, for example, a Differential Global Positioning System (DGPS) receiver or another high-accuracy position sensing device. Position information from the second sensor X1 is also presented as an input to position controller U1. The position controller U1 uses the information from the encoder E1 and the position sensor X1 to accurately establish a location of the RTG crane 300 relative to a selected position, for example a reference position on a selected path. An output of the position controller U1 is connected to an input to the motor driver/controller MC2 to establish closed-loop control of the drive wheel W1 on the RTG crane 300.

Figure 16:
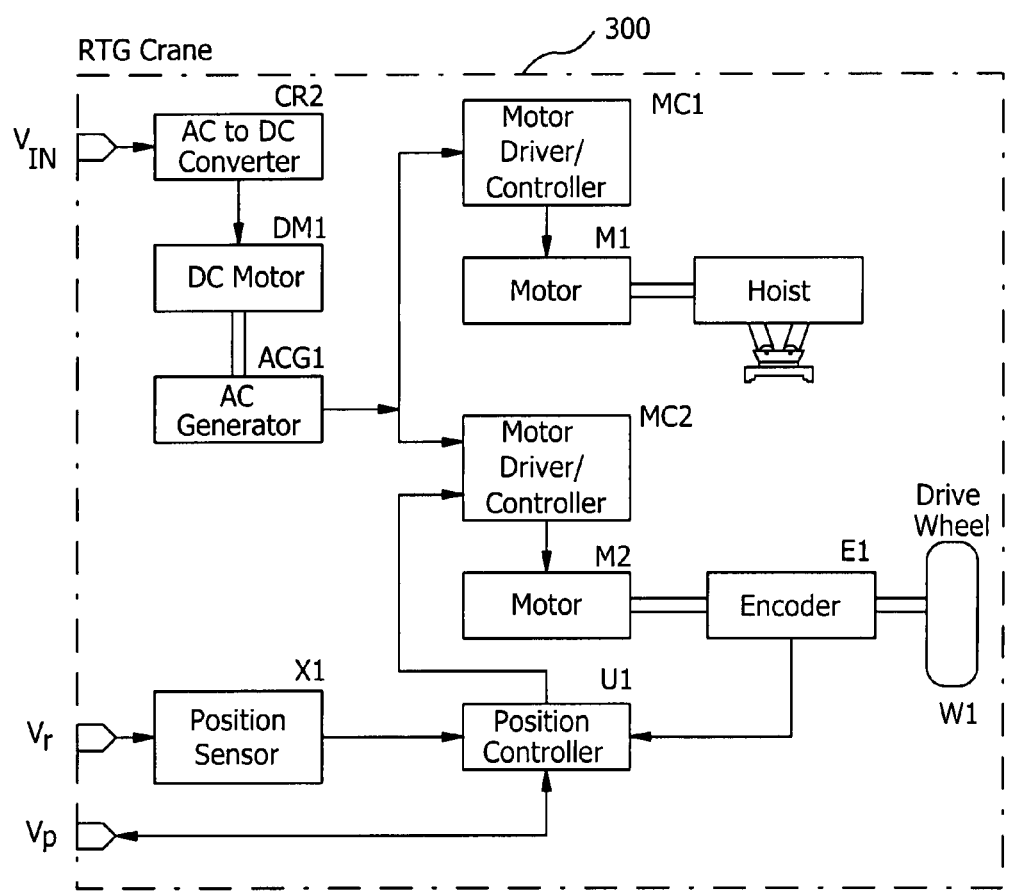
FIG. 16 is a block diagram of an RTG Crane adapted in accord with the present invention to operate from input electrical power having a relatively low input voltage. Optional position signal connections and crane position control means are also shown.

Some RTG cranes have an on-board AC generator driven by a DC motor. A motor-generator pair may isolate the voltage network on one system (in this case the RTG crane) from the voltage network on another system (for example, the power junction trolley). An example of an RTG crane comprising a DC motor and an AC generator adapted for operation from a low voltage AC input from a power junction trolley is shown in FIG. 16. Low voltage AC power is coupled to a power input terminal $V_{IN}$ on the RTG crane 300 in FIG. 16. The low voltage AC power is an output from a power junction trolley, for example the power junction trolley of FIG. 15. An AC to DC converter CR2 in FIG. 16 has an input connected to the power input terminal $V_{IN}$. An AC to DC converter is a power conversion circuit for transforming AC input power to DC output power. Circuits for converting AC power to DC power are well known in the art and may include, for example, rectifiers, inverters, and other electrical circuits. One skilled in the art will understand that there are many alternative embodiments of an AC to DC converter that may be adapted for use in the present invention. DC output power from the AC to DC converter CR2 is connected to an input of a DC motor DM1. The DC motor DM1 drives an AC generator ACG1 whose output is AC power used by other equipment on the RTG crane.

In FIG. 16, AC power from the AC generator ACG1 is connected to an input of a first motor driver/controller MC1. AC power from the AC generator ACG1 is further connected to an input of a second motor driver/controller MC2. The motor driver/controllers and other components shown in FIG. 16 for the RTG crane 300 have connections and functions as previously described for the corresponding components in FIG. 13.

In another embodiment, a power junction trolley is adapted to output DC power to an RTG crane equipped with an onboard diesel engine and AC generator. A DC power connection between the power junction trolley and RTG crane may be useful, for example, to retrofit electric power to an RTG crane previously powered only by a diesel engine. Alternatively, a new RTG crane having a diesel engine and an AC generator may be constructed to operate from a power junction trolley having a DC power output so that the RTG crane may perform cross-lane maneuvers without requiring an external source of high voltage input power.

Figure 17:
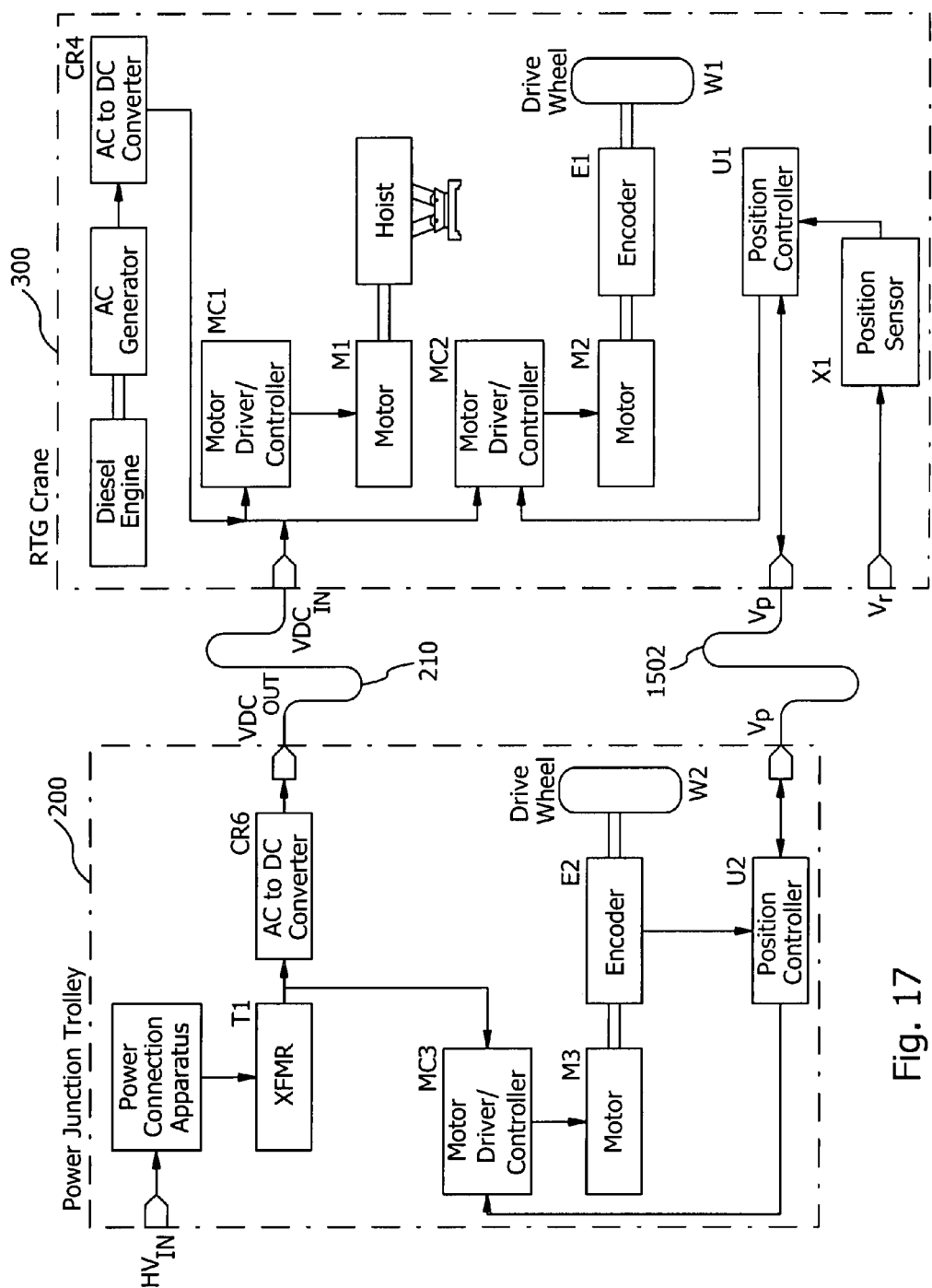
FIG. 17 is a block diagram of a power junction trolley adapted to output power having a relatively low DC voltage and an RTG crane adapted to receive the DC power from the trolley. An optional diesel engine aboard the RTG crane and associated electrical generation and conversion equipment are also shown.

A power junction trolley adapted to output DC power and an RTG crane having a diesel engine and further adapted to operate from DC input power is shown in FIG. 17. In FIG. 17, an AC output of the transformer T1 on the power junction trolley 200 is connected to an input of an AC to DC converter CR6, which has an output comprising a DC power signal. The output from the AC to DC converter CR6 is connected to a DC output power terminal $VDC_{OUT}$ on the power junction trolley 200. Other components and connections comprising the power junction trolley 200 in FIG. 17 are as described for the corresponding components and connections on the power junction trolley 200 in FIG. 15.

In FIG. 17, DC output power from the power junction trolley 200 is connected from the DC output power terminal $VDC_{OUT}$ to a corresponding DC input power terminal $VDC_{IN}$ on the RTG crane 300. An embodiment of a flexible power cable 210 adapted for carrying DC voltage and current connects from terminal $VDC_{OUT}$ on the power junction trolley 200 to terminal $VDC_{IN}$ on the RTG crane 300. The RTG crane 300 further comprises a diesel engine which drives an AC generator. An AC power output from the AC generator is connected to an input of an AC to DC converter CR4, which has a DC power output. The DC power output of the AC to DC converter CR4 is connected to the corresponding DC input power terminal $VDC_{IN}$, thereby enabling the RTG crane 300 to operate from power provided by either the power junction trolley 200 or the diesel engine onboard the RTG crane. A first motor controller/generator MC1 and a second motor controller/generator MC2 in the RTG crane 300 in FIG. 8 are adapted to accept DC input power. The remaining components and connections shown for the RTG crane 300 are as described for the corresponding components and connections for the RTG crane 300 in FIG. 15.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, or use of equivalent functional steps for steps described herein. Such insubstantial variations are to be considered within the scope of what is contemplated here. Moreover, if plural examples are given for specific means, or steps, and extrapolation between or beyond such given examples is obvious in view of the present disclosure, then the disclosure is to be deemed as effectively disclosing and thus covering at least such extrapolations.

Unless expressly stated otherwise herein, ordinary terms have their corresponding ordinary meanings within the respective contexts of their presentations, and ordinary terms of art have their corresponding regular meanings.

What is claimed is:

1. An apparatus for coupling power from a high voltage electrical network to a low voltage power input on a mobile crane, comprising:
   a trolley;
   a guiding apparatus attached to said trolley;
   a transformer attached to said trolley, comprising:
      a high voltage input; and
      a low voltage output having a value selected for powering the crane;
   a power input coupler adapted to receive power from the high voltage electrical network, said power input coupler connected to said high voltage input of said transformer;
   a rubber tire gantry crane having a low voltage input connected to said low voltage output;
   a flexible signal cable connecting said trolley to said rubber tire gantry crane;

a position signal representative of a position of said trolley; and a position of said rubber tire gantry crane, wherein said rubber tire gantry crane is adapted to modify said position of said rubber tire gantry crane in response to said position signal.

2. The apparatus of claim 1, wherein said power input coupler is adapted to receive power inductively.

3. The apparatus of claim 1, wherein said power input coupler is adapted to connect to a high voltage cable.

4. The apparatus of claim 1, further comprising a power conversion circuit having an alternating current (AC) input and a direct current (DC) output, wherein said power conversion circuit is inserted in series between said low voltage output of said transformer and said low voltage input, and said rubber tire gantry crane is adapted to operate from a DC current.

5. The apparatus of claim 1, further comprising:
a cable reel rotationally coupled to said trolley;
an electrical connection between said power input coupler and said cable reel; and
an electrical connection between said cable reel and said high voltage input of said transformer.

6. The apparatus of claim 5, further comprising:
a selected path for said trolley; and
a guide rail located a selected separation distance from said selected path.

7. The apparatus of claim 6, further comprising:
a first guide rail side;
a second guide rail side;
said guiding apparatus further comprising a guide roller assembly attached to said power junction trolley; and
said guide roller assembly further comprising:
a guide roller assembly bracket;
a first guide roller axle attached to said guide roller assembly bracket;
a second guide roller axle attached to said guide roller assembly bracket;
a first guide roller rotatably assembled to said first guide roller axle, wherein said first guide roller rolls along said first guide rail side; and
a second guide roller rotatably assembled to said second guide roller axle, wherein said second guide roller rolls along said second guide rail side.

8. The apparatus of claim 6, further comprising:
a first position sensor attached to said trolley;
a first position sensor output signal representing a first distance of said trolley from said guide rail; and
a position controller attached to said trolley, wherein said position controller has a first input connected to said first position sensor output signal and a first output value representing said first distance from said guide rail.

9. The apparatus of claim 8, further comprising:
said trolley further comprising four wheels;
said position controller having a first control output;
an electric motor controller having a control input connected to said position controller first control output and a motor control output; and
an electric motor having a rate of rotation wherein said electric motor is cooperatively connected to at least one of said wheel on said trolley and said rate of rotation of said electric motor is controlled by said electric motor controller motor control output.

10. The apparatus of claim 9, further comprising:
a second position sensor attached to said trolley;
a second position sensor output signal representing a second distance of said trolley from said guide rail; and said position controller having a second input connected to said second position sensor output signal and a second output value representing said second distance from said guide rail.

11. The apparatus of claim 10, further comprising:
said trolley having a direction of travel;
said position controller having a second control output;
a second electric motor controller having a control input connected to said position controller second control output and a motor control output; and
a second electric motor having a rate of rotation cooperatively connected to at least one of said wheel on said trolley, wherein said rate of rotation of said second electric motor is controlled by said second electric motor controller motor control output.

12. The apparatus of claim 11, further comprising:
a selected direction of travel of said trolley; and
a deviation angle output signal from said position controller, wherein said deviation angle output signal represents an angle between said direction of travel of said trolley and said selected direction of travel of said trolley.

13. The apparatus of claim 12, wherein said position controller controls said first electric motor and said second electric motor to change said direction of travel of said trolley in response to a value of said deviation angle output signal.

14. A method for connecting shore power to a rubber tire gantry crane, comprising:
connecting a shore power cable to a high voltage power input on a power junction trolley;
connecting a flexible power cable from a low voltage power output on the power junction trolley to a low voltage power input on the rubber tire gantry crane;
disconnecting the rubber tire gantry crane from the flexible power cable; and
connecting the rubber tire gantry crane to a second flexible power cable from a second power junction trolley, without disconnecting a shore power connection.

15. The method of claim 14, further comprising:
selecting a position for the shore power cable;
selecting a path for the power junction trolley relative to the position for the shore power cable; and
moving the power junction trolley along the selected path in response to a corresponding movement of the rubber tire gantry crane.

16. The method of claim 15, further comprising:
communicating a position of the shore power trolley to the rubber tire gantry crane; and
adapting a position of the rubber tire gantry crane in response to the position of the power junction trolley.

17. A rubber tire gantry crane powered from an external electrical power source comprising:
a power junction trolley comprising:
a high voltage input terminal;
a low voltage output terminal; and
a transformer comprising:
a high voltage input connected to said high voltage input terminal on said power junction trolley; and
a low voltage output connected to said low voltage output terminal on said power junction trolley;
a low voltage input terminal on the rubber tire gantry crane;
a flexible power connection from said low voltage output terminal on said power junction trolley to said low voltage input terminal on the rubber tire gantry crane; and
a power conversion circuit having an alternating current (AC) input and a direct current (DC) output, wherein said power conversion circuit is inserted in series between said low voltage output of said transformer and said low voltage input terminal, said rubber tire gantry crane is adapted to operate from a DC current, and disconnecting the rubber tire gantry crane from the external power source does not interrupt a high voltage connection.

18. The rubber tire gantry crane of claim 17, further comprising:
   a selected path for said power junction trolley;
   a guide rail having a position relative to said selected path for said power junction trolley; and
   a guide roller assembly attached to said power junction trolley, wherein said guide roller assembly further comprises:
      a guide roller assembly bracket;
      a first guide roller axle attached to said guide roller assembly bracket;
      a second guide roller axle attached to said guide roller assembly bracket;
      a first guide roller rotatably assembled to said first guide roller axle; and a second guide roller rotatably assembled to said second guide roller axle,
   wherein said first and second guide rollers roll along said guide rail, thereby causing said power junction trolley to follow said selected path for said power junction trolley.

19. The rubber tire gantry crane of claim 17, wherein said power junction trolley further comprises:
   a first position sensor having an output signal representing a first position of said power junction trolley;
   a second position sensor having an output signal representing a second position of said power junction trolley;
   a motor having a rate of rotation;
   a motor controller having a control input and an output connected to said motor;
   a position controller having a control output connected to said control input on said motor controller, a first input connected to said first position sensor output, and a second input connected to said second position sensor output;
   a selected direction of travel; and
   a measured direction of travel related to said first and second position sensor output signals,
   wherein said position controller changes said rate of motor rotation in response to a difference between said measured direction of travel and said selected direction of travel.

* * * * *